US012241566B2

(12) United States Patent
Yousif et al.

(10) Patent No.: US 12,241,566 B2
(45) Date of Patent: Mar. 4, 2025

(54) ADAPTER FOR WIRELESS DATA TRANSMISSION

(71) Applicant: SAMSON AKTIENGESELLSCHAFT, Frankfurt am Main (DE)

(72) Inventors: Leonard Yousif, Wiesbaden (DE); Melanie Dürr, Frankfurt am Main (DE); Andreas Klein, Nidderau (DE); Christian Mellinger, Obertshausen (DE)

(73) Assignee: SAMSON AKTIENGESELLSCHAFT, Frankfurt am Main (DE)

( * ) Notice: Subject to any disclaimer, the term of this patent is extended or adjusted under 35 U.S.C. 154(b) by 201 days.

(21) Appl. No.: 17/913,977

(22) PCT Filed: Mar. 16, 2021

(86) PCT No.: PCT/EP2021/056684
§ 371 (c)(1),
(2) Date: Sep. 23, 2022

(87) PCT Pub. No.: WO2021/191000
PCT Pub. Date: Sep. 30, 2021

(65) Prior Publication Data
US 2023/0184351 A1      Jun. 15, 2023

(30) Foreign Application Priority Data

Mar. 24, 2020   (DE) .......................... 102020108075.1

(51) Int. Cl.
*F16K 37/00* (2006.01)
(52) U.S. Cl.
CPC ............................ *F16K 37/0058* (2013.01)

(58) Field of Classification Search
CPC .......................... F16K 37/0025; F16K 37/0058
See application file for complete search history.

(56) References Cited

U.S. PATENT DOCUMENTS 6,044,791 A * 4/2000 LaMarca ............. F16K 37/0058
340/672
6,871,665 B2 * 3/2005 Hannah ............... F16K 37/0058
137/553
(Continued)

FOREIGN PATENT DOCUMENTS

CN       107449466 A     12/2017
DE    102009047535 A1     6/2011
(Continued)

OTHER PUBLICATIONS

Mounting and operating instructions EB 8384-6S EN (Year: 2017).*
(Continued)

*Primary Examiner* — Umashankar Venkatesan
(74) *Attorney, Agent, or Firm* — GrowIP Law Group LLC

(57) ABSTRACT

An adapter for wireless data transmission, in particular according to the "Bluetooth Low Energy" standard, is proposed. The adapter has a cylindrical housing whose radius is at least twice its height. The adapter includes a wireless transceiver and a processor arranged in the cylindrical housing and connected to the wireless transceiver, and a data interface connected to the processor. The processor is arranged to drive the transceiver and the data interface and can therewith transmit data wirelessly. Because the adapter for wireless data transmission has a flat design, it can be retrofitted in valve positioners. This makes it possible to retrofit commonly used valve positioners that until now do not have an option for wireless transmission of their status data with this adapter. As a result, these commonly used
(Continued)

valve positioners also achieve the capability of wireless transmission of their status data.

11 Claims, 4 Drawing Sheets

(56) References Cited

U.S. PATENT DOCUMENTS

| | | | |
|---|---|---|---|
| 6,899,129 B2* | 5/2005 | Jannotta | F16K 37/0058 |
| | | | 137/553 |
| 9,149,615 B2* | 10/2015 | Wilson | F16K 35/16 |
| 9,546,742 B2* | 1/2017 | Brown | F16K 37/0041 |
| 10,428,627 B2* | 10/2019 | Elmer | E21B 43/129 |
| 10,859,176 B2* | 12/2020 | Chen | F16K 37/0083 |
| 2002/0180615 A1 | 12/2002 | Kim | |
| 2007/0293152 A1 | 12/2007 | Rosen et al. | |
| 2009/0108219 A1* | 4/2009 | Schreiner | F16K 37/0033 |
| | | | 251/129.1 |
| 2017/0046043 A1* | 2/2017 | Karg | F16K 37/0025 |
| 2017/0114926 A1* | 4/2017 | Soloway | F16K 37/0058 |
| 2019/0017626 A1* | 1/2019 | Hebert | F16K 37/0083 |
| 2019/0114891 A1 | 4/2019 | Eck | |

FOREIGN PATENT DOCUMENTS

| | | |
|---|---|---|
| EP | 1647751 B1 | 1/2013 |
| EP | 2294364 B1 | 3/2019 |
| EP | 3576508 B1 | 12/2020 |
| WO | 2019070534 A1 | 4/2019 |

OTHER PUBLICATIONS

IEEE 802.15.4.
International Search Report and Written Opinion for PCT/EP2021/056684 mailed Sep. 9, 2021.

* cited by examiner

ADAPTER FOR WIRELESS DATA TRANSMISSION

CROSS-REFERENCE TO RELATED APPLICATIONS

This application is a U.S. National Stage Application that claims the benefit of the filing date of International PCT Application No. PCT/EP2021/056684, filed Mar. 16, 2021, that claims priority to German Patent Application No. DE102020108075.1, filed on Mar. 24, 2019, which are hereby incorporated by reference in their entirety.

TECHNICAL FIELD

The disclosure relates to the field of process plants in which the flow of process media is controlled by means of control valves. These control valves contain electronically controlled valve positioners. The operating status of these valve positioners must be monitored regularly. This can be done either by optical inspection or by data transmission. The disclosure relates in particular to an adapter for wireless data transmission in this context.

BACKGROUND

Wireless reading of status data from field devices is playing an increasingly important role in process plants.

The publication EP 1 647 751 B1 describes a valve positioner having a module for a wireless connection to an external readout device. The wireless connection between the valve positioner and the readout device can be established by equipping the actuator with a radio frequency transceiver, such as Bluetooth or WIFI. At each wireless communication location or node, a unique identification code is provided that is unique to that node, avoiding any risk of interference or incorrect command transmission.

The publication WO 2019/070534 A1 describes a field device having a network bridge that converts first data received at a first Bluetooth Low Energy (BLE) radio device of the network bridge over a BLE network from a second BLE radio device of a remote device, and formatted according to a BLE communication protocol, into second data formatted according to an industrial communication protocol.

None of the wireless connection modules described can be retrofitted.

SUMMARY

Problem

It is the object of the disclosure to provide a retrofittable wireless connection module for a valve positioner.

Solution

This problem is solved by the subject matter of the independent claim. Advantageous embodiments of the subject matter of the independent claim are indicated in the sub-claims. The wording of all claims is hereby incorporated in this description by reference. The use of the singular shall not exclude the plural, which shall also apply in the reverse sense, unless otherwise disclosed.

To solve the problem, an adapter for wireless data transmission, in particular according to the "Bluetooth Low Energy" standard, is proposed. The adapter has a cylindrical housing, the radius of which is at least twice and at most ten times as large as its height. The adapter includes a wireless transceiver and a processor disposed in the cylindrical housing and connected to the wireless transceiver, and a data interface connected to the processor. The processor is adapted to drive the transceiver and the data interface and can transmit data wirelessly therewith.

The fact that the adapter for wireless data transmission has a flat design means that it can be retrofitted in valve positioners. This makes it possible to retrofit common valve positioners that do not yet have the option of wireless transmission of their status data with this adapter. As a result, these common valve positioners also achieve the capability of wireless transmission of their status data.

The possibility of retrofitting is expanded even more when the radius of the cylindrical housing is at least three times its height.

In order to be able to clamp the adapter frictionally in the window usually present in the housing of a valve positioner, it is advantageous if the cylindrical housing of the adapter has a plurality of outwardly projecting teeth with which the adapter fits into the window.

A particularly simple design and manufacture results when the processor is mounted on a printed circuit board and the printed circuit board is encapsulated with a polyamide adhesive on the side equipped with the processor. The encapsulated printed circuit board then forms the housing.

Alternatively or cumulatively to the teeth, the housing can have a circumferential collar. When the housing is inserted into the window, it can abut flush with the circumferential collar and thus be positioned.

In order to be able not only to transmit the operating status of the valve positioner wirelessly, but also to display it, the cylindrical housing can have an optical signaling device on the side facing away from the processor.

The optical signaling device may be based on various technologies, for example, liquid crystals and/or electronic paper and/or light emitting diodes.

It is common to indicate the operating status with the help of two light-emitting diodes of different color.

A red and a green light-emitting diode are typically used for this purpose.

The data interface provided on the processor can be connected to an electrical connector attached to the end of the cable via a flexible cable, a ribbon cable or a flat conductor cable. Such a flexible cable allows the housing of the valve positioner to be opened without moving the adapter or disconnecting the data connection between the valve positioner and adapter.

Alternatively or cumulatively to a cable connection, the data interface can also be designed as an infrared interface.

In general, the processor will use the transceiver to transmit data according to one of the following standards:
  ZigBee and/or
  Wireless Highway Addressable Remote Transducer (HART) and/or
  WiFi and/or
  Bluetooth and/or
  Bluetooth Low Energy, in particular according to the IEEE 802.15.4 standard.

The problem is further solved by the use of an adapter as described for upgrading a valve positioner. The valve positioner has a housing with a window opening and a device for monitoring the operating condition. Furthermore, an operating status display of the device for monitoring the operating condition, which is located inside the housing behind the window opening and can be seen from the outside, and an interface for outputting data concerning the operating condition. In the proposed use, the adapter is installed in the housing of the valve positioner with the adapter positioned between the operating status indicator and the window opening in a position that allows inspection of the signaling device through the window opening. In addition, the adapter is connected to the interface to receive operating status data via the interface and, in response to receipt of this data, to control the optical signaling device to provide a predetermined optical signal.

The problem is further solved by a valve positioner with a housing having a window opening. The valve positioner also includes a device for monitoring the operating condition. The latter includes an operating status display located inside the housing behind the window opening and visible from the outside. The valve positioner also includes an interface for outputting data concerning the operating condition. It is proposed to add the adapter described above to the valve positioner to provide it with the further capability of wireless data transmission. The adapter is connected to the interface. Due to the flat design of the above-described adapter, it can be positioned between the operating status display and the window opening, in a position that allows inspection of the signaling device through the window opening. When the processor receives data from the valve positioner operating condition monitoring device indicating an operating condition of the valve positioner, it can respond by triggering the optical signaling device to provide a predetermined optical signal indicating that operating condition.

To tie in with traffic habits, the processor of the adapter has control routines configured to display information about the operating status of the valve positioner using the red and green light emitting diodes as specified by the NAMUR codes.

The task is further solved by a process plant with at least one valve with the valve positioner described further above with an adapter for wireless data transmission proposed here.

BRIEF DESCRIPTION OF THE DRAWINGS

Further details and features result from the following description of preferred embodiments in connection with the figures. The respective features may be implemented individually or in combination with each other. The possibilities of solving the problem are not limited to the embodiments.

An embodiment is shown schematically in the figures. Identical reference numerals in the individual figures denote identical or functionally identical elements or elements that correspond to one another in terms of their functions. Specifically.

DETAILED DESCRIPTION

FIG. 1

Figure 1:
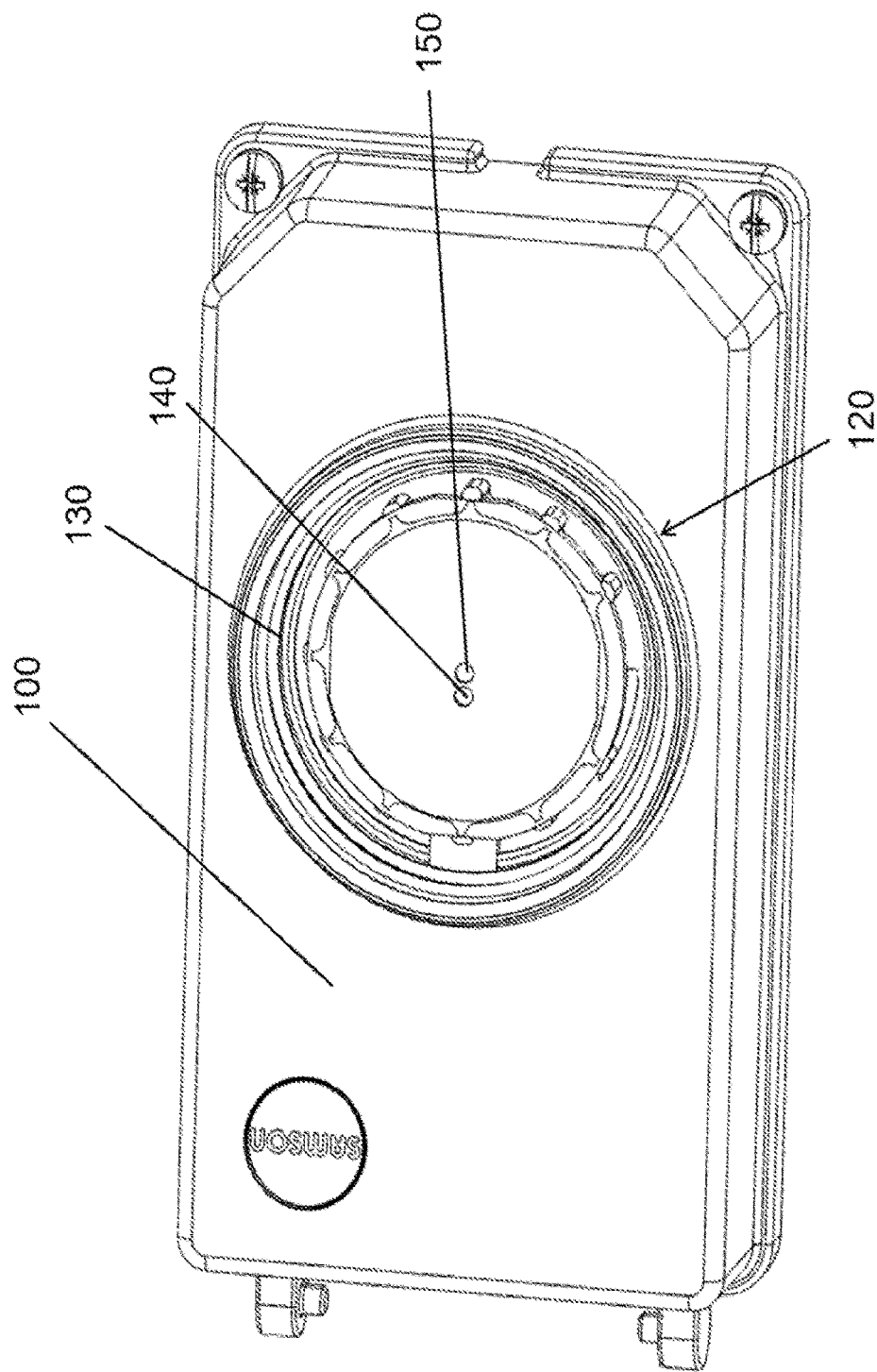
FIG. 1 shows a perspective view of the assembly of the BLE adapter and the housing cover of the valve control unit, looking at the window opening from the outside.

FIG. 1 shows the assembly of the BLE adapter and the housing cover 100 of the valve positioner in a perspective view seen from the outside of the window opening 120. The red LED 140, the green LED 150 and any explanatory labeling or illustration on the visible side of the BLE adapter can be seen through the transparent pane 130.

Since the installation can be accomplished without removing the transparent pane 130, an existing IP protection qualification for the valve positioner housing can be preserved. Otherwise, the IP protection would be lost with the removal of the transparent pane 130 and would have to be restored by a suitable conversion and recertification by a specialist with sufficient qualifications.

FIG. 2

Figure 2:
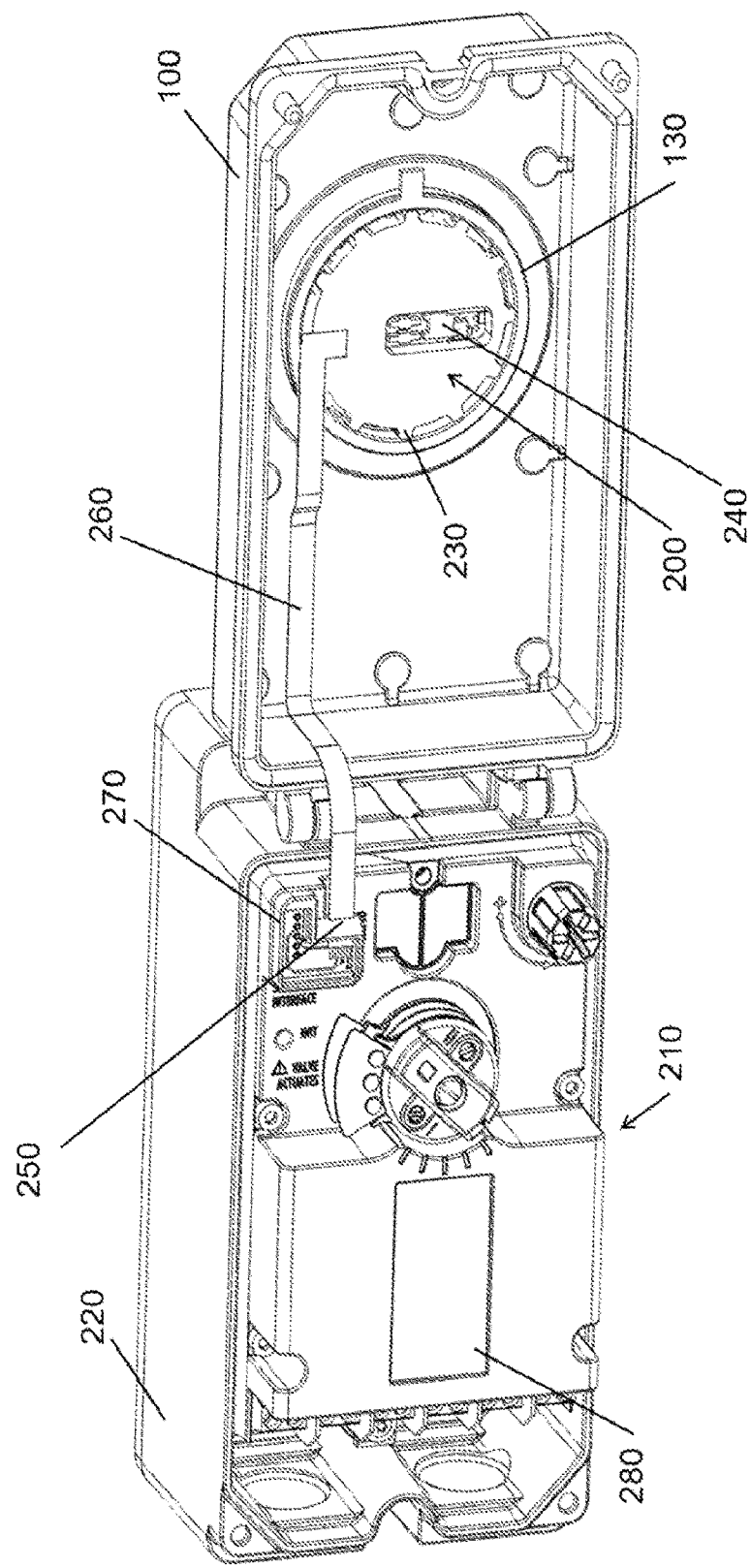
FIG. 2 shows the assembly of BLE adapter and valve positioner.

FIG. 2 shows the assembly of BLE adapter 200 and valve positioner (VSR) 210, with the VSR housing shown open. The unfolded view provides a perspective view of the inside of the valve positioner 210. The valve positioner housing consists of a base body 220 and a cover 100.

The BLE adapter 200 is pressed into the cylindrical rear recess of the viewing window 120 from the inside of the housing and is frictionally held in a clamping manner by the teeth 230. In this mounting position, the LEDs 140, 150 of the BLE adapter 200 face the transparent window 130 and are visible from the outside of the housing. The central area of the printed circuit board (PCB) 410 (see FIG. 4) recessed from the injection molding (see below) allows access to the microswitch 240 for pairing with a mobile device, including in particular the authentication required for this purpose. The microswitch 240 must be manually operated by the person reading it, which is why the positioner cannot be read from outside the factory premises.

The connector 250 on the flat conductor flat cable (FFC) 260 is inserted into the SSP (SAMSON Serial Protocol) socket 270 of the positioner 210. From there, the BLE adapter 200 draws the required electrical power for operation. The FFC 260 can be partially glued to the inside of the housing cover 100 to prevent it from buckling or folding when the housing is closed.

FIG. 3

Figure 3:
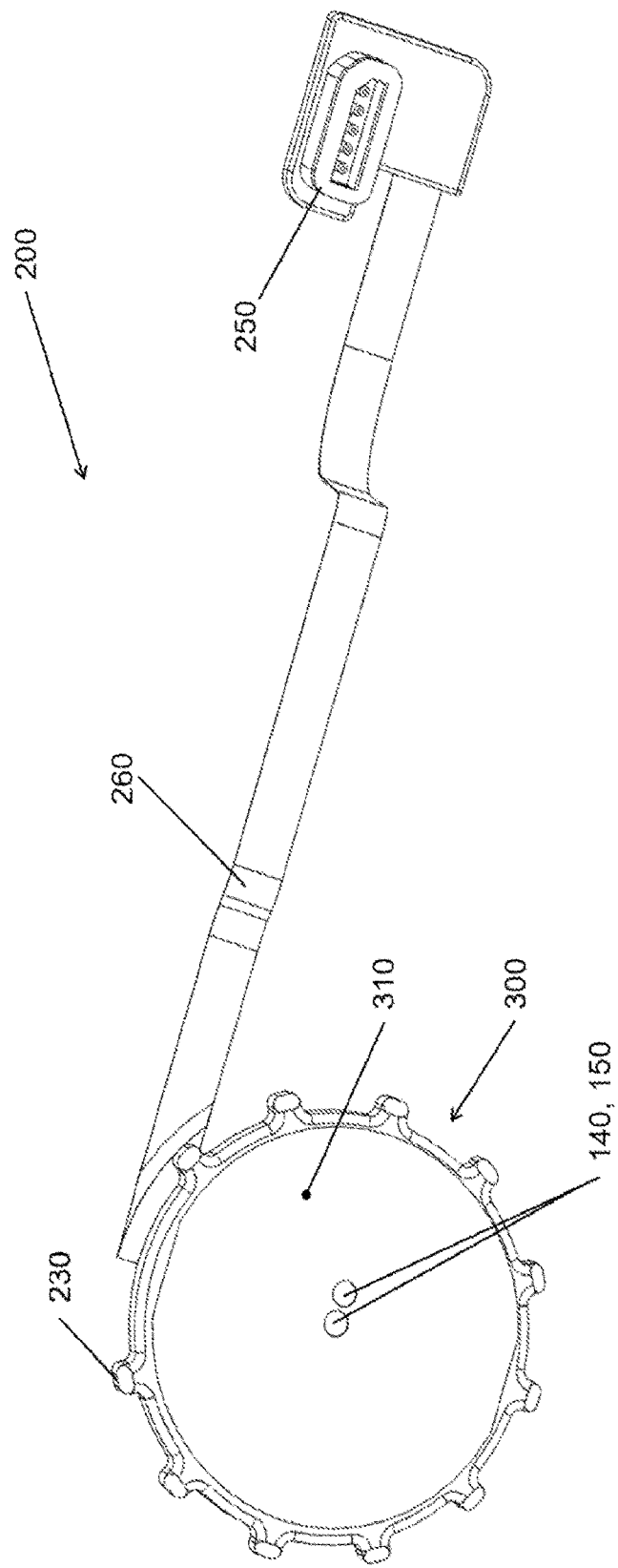
FIG. 3 shows the isolated BLE adapter in perspective view with flat cable and connector for connection to the SSP (SAMSON Serial Protocol) socket of the positioner.

The BLE adapter 200 according to FIG. 3 includes a housing 300 and a flat conductor flat cable (FFC) 260 attached thereto, i.e. a flat parallel arrangement of flat conductors. An angled connector 250 is found at the end of the FFC 260.

The housing 300 is essentially cylindrical or disc-shaped. It is made of black polyamide (see below). The teeth 230 are located at its circumference. The outermost circumference of the housing 300 including the teeth 230 is selected such that the housing with its teeth just fits into the cylindrical, rear recess of the viewing window 120 and clamps there frictionally. Between the smaller circumference of the housing 300 in the cylindrical part and the larger circumference of the housing 300 including teeth 230 and the cylindrical, rear recess of the viewing window 120, an air gap remains between any 2 teeth, through which moisture can be drawn off from the viewing window 120, so that no condensation of moisture occurs in the viewing window 120. The lateral teeth 230 of the housing 300 serve to align and fix it in the circular bore of the window 120 and at the same time allow ventilation of the gap between the transparent pane 130 and the housing 300 of the BLE adapter 200.

The visible side 310 of the housing reveals 2 holes through which the red and green LEDs 140, 150 can shine, which are mounted on the component side of PCB 410 (see below).

FIG. 4

Figure 4:
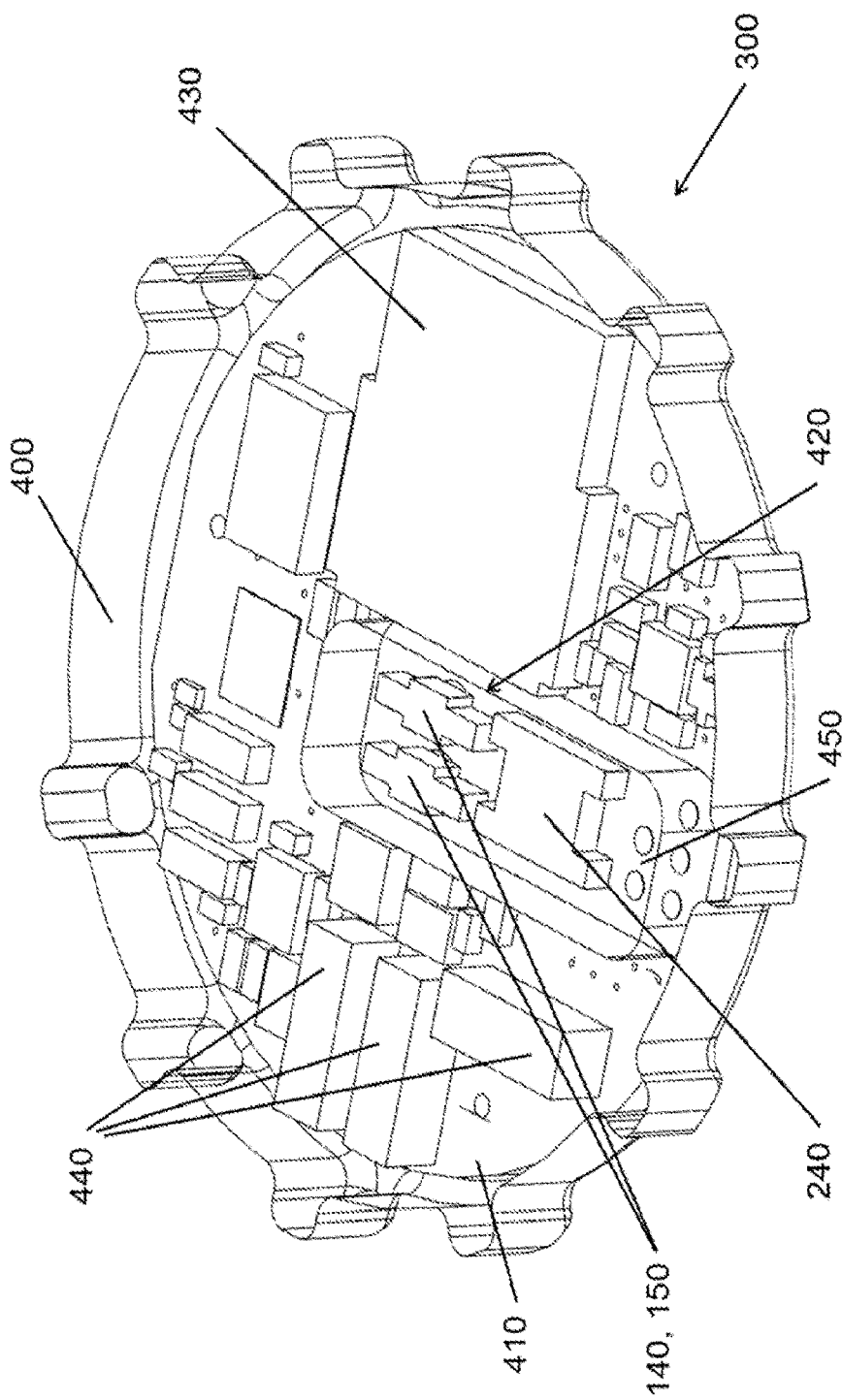
FIG. 4 shows the housing of the BLE adapter with internals in a partial section view.

FIG. 4 shows the housing 300 of the BLE adapter 200 with internals in a partial section view, in which the plastic mass is rendered invisible except for the prismatic edge surfaces 400. The perspective is slightly oblique from above to the visible side 310, i.e. to the side with the LEDs 140, 150.

The housing 300 is produced by partially back-injecting a rigid, multilayer printed circuit board (PCB) 410 with a compatible plastic material in a low-pressure process from the assembly side. Specifically, Makromelt® OM 641, a polyamide adhesive from Henkel, Düsseldorf, is used. Compared to most potting materials, the strength of the cured Makromelt® is sufficient for the desired mechanical stability of the outer surfaces of the housing 300.

The back injection molding creates the housing 300 with material-locking coverage of the components on the placement side of the PCB 410 in one step. The rear side of the placement side is the visible side 310 of the housing 300.

After back molding, a rectangular central area 420 remains free on the placement side of the PCB 410. A microswitch 240, a contact 450 and two LEDs 140, 150 are arranged there on the placement side. The microswitch 240 is oriented towards the placement side to be operated from there. The contacting is also oriented towards the placement side and allows electrical access to the PCB 410 for testing purposes and initialization. Contacts 450 are provided for power supply and for access to a serial asynchronous interface (UART).

The LEDs 140, 150 are also arranged on the placement side of the PCB 410, but radiate towards the visible side 310 of the housing 300 of the BLE adapter 200. For this purpose, the PCB 410 has two openings towards the unpopulated rear side.

Furthermore, after injection molding of the housing 300, the rear side of the PCB 410 opposite the component side remains completely free. This is subsequently covered by a protective foil except for the openings for the LEDs 140, 150. Thus, the protective foil forms the visible surface on the visible side 310 of the BLE adapter 200 and can be provided with printed explanations and/or pictograms regarding the meaning of the LED display.

Underneath the plastic material, an "off-the-shelf" BLE module 430 (e.g. FANSTEL BC832 "Micro BLE 5.0 Module for Wearable IoTs") is located on the assembly side of PCB 410, which combines a processor transceiver (Nordic Semiconductor nRF52832) with a suitable antenna and various circuitry in an autonomously operable manner.

The other equipment covered on the component side of PCB 410 concerns drivers for LEDs 140, 150 and circuits for signal level adjustment and for stabilizing the supply voltage in phases of increased current consumption by the BLE module 430. Comparatively large amounts of space are taken up by the back-up capacitors 440 on the left-hand side.

The housing 300 with the partially embedded PCB 410 is designed for outdoor use (hazardous, Ex area). It is an Exi, i.e. type of ignition protection "intrinsic safety", certified circuit and housing configuration. This allows the customer service technician to establish communication with a mobile Ex-certified terminal device and read out data from the positioner even in the Ex area, e.g. Zone 1, without fire.

As an alternative design, it is envisaged that the housing of the BLE module can be shaped differently in order to be inserted into the opening of the cover of the valve positioner in place of the transparent window. In this case, the housing of the BLE adapter will have, in particular, a circumferential collar that rests on the window seal from the outside in order to take over the sealing function of the transparent window. Because of the omission of the transparent pane, the housing of the BLE adapter would also have to be sufficiently robust on the visible side.

NAMUR-Recommendation for Status Display

The following Tab. 1 shows the NAMUR recommendation for a status display with red and green LEDs. NAMUR defines a minimum standard for displaying the device status on field devices by means of two digital independently switchable LED color indicators in red and green. The display with a yellow LED is not necessary for compliance with the specification.

TAB. 1

| status signal | LED | alternative LED |
| --- | --- | --- |
| failure | red | |
| function check | flashing red | |
| outside of specification | flashing red | |
| maintenance required | flashing green | blue |
| supply and correct operation * | green | |
| switching contact* | yellow | |

*no status signal, additional device information only for devices with binary output Since the BLE adapter 200 covers the LCD display 280 of the positioner 210 due to the installation situation (see FIG. 2), its function for the purpose of a control of the device by the operating personnel is omitted. The two LEDs 140, 150 on the visible side 310 of the BLE adapter 200 meet the minimum standard recommended by NAMUR with regard to a display for control purposes.

However, because of the intrinsically safe design of the BLE adapter 200, when it is used with an intrinsically safe designed valve positioner 210, the housing of the valve positioner 210 may also be opened during live operation to gain access to the display 280.

Glossary

BLE

BLE stands for "Bluetooth Low Energy", a common specification for wireless data transmission. BLE is a radio technology that can be used to network devices in an environment of about 10 meters. Devices using the BLE standard transmit in a frequency band between 2.402 GHz and 2.480 GHz. Compared to "classic" Bluetooth, BLE should have significantly lower power consumption and lower costs with a similar communication range.

IP Protection Classes

With regard to their suitability for various environmental conditions, electrical drive equipment is designed with suitable protection classes, expressed with IP codes. The abbreviation IP stands for International Protection. There are various German and international standards for the IP codes.

The type of protection must be distinguished from the electrical protection class. While the type of protection defines the protection of active parts against contact, penetration of foreign objects and water as well as shock resistance (so-called enclosure protection), the protection class describes measures against dangerous voltages on touchable conductive parts of equipment that are not live during operation.

NAMUR Recommendation

NAMUR—"Interessengemeinschaft Automatisierungstechnik der Prozessindustrie"—is an international association of users of automation technology in the process industry, founded on Nov. 3, 1949. The original full name "Normenarbeitsgemeinschaft für Mess-und Regeltechnik in der chemischen Industrie", from which the acronym "NAMUR" is derived, is no longer used today. NAMUR supports the exchange of experience among its members and with other associations and federations.

The results of this work are published in the form of NAMUR recommendations and worksheets and, if necessary, submitted to national and international standardization bodies as standardization proposals. They are experience reports and working documents which NAMUR has prepared for its members from the circle of users for optional use. They are used by many companies worldwide.

NAMUR Recommendations (NE) provide an explanation of the state of the art and regulations for member companies as well as for manufacturers, scientists and authorities. NAMUR worksheets (NA) are an aid in the form of checklists and instructions for practical work in the companies. There are currently approximately 115 valid NEs and NAs.

REFERENCE NUMERALS 100 housing cover
120 window opening
130 transparent pane
140 red LED
150 green LED
200 BLE adapter
210 valve positioner (VSR)
220 main body
230 teeth
240 microswitch
250 connector
260 flat conductor flat cable (FFC)
270 SSP (SAMSON Serial Protocol) socket
280 LCD display
300 housing
310 visible side
400 prismatic boundary surfaces
410 printed circuit board (PCB)
420 rectangular central area
430 BLE module
440 backup capacitors
450 contact

The invention claimed is:

1. A valve positioner comprising:
a housing with a window opening;
a device for monitoring the operating condition;
an operating status display of the device for monitoring the operating condition located inside the housing behind the window opening and visible from the outside;
with an interface for outputting data concerning the operating condition;
with an adapter for wireless data transmission, according to the "Bluetooth Low Energy" standard, comprising:
a cylindrical housing, the radius of which is at least twice and at most ten times as large as its height;
a wireless transceiver;
a processor disposed in the cylindrical housing and connected to the wireless transceiver; and
a data interface connected to the processor, wherein the processor is adapted to drive the transceiver and the data interface and to wirelessly transmit data therewith;
wherein the cylindrical housing has an optical signaling device on the side facing away from the processor;
wherein the adapter is connected to the interface; and
wherein the adapter is positioned between the operating status display and the window opening in a position that allows inspection of the signaling device through the window opening.

2. A process plant having at least one valve with the valve positioner according to claim 1.

3. The valve positioner according to claim 1, wherein the radius of the cylindrical housing of the adapter is at least three times as large as its height.

4. The valve positioner according to claim 1, wherein the cylindrical housing of the adapter has a plurality of outwardly projecting teeth.

5. The valve positioner adapter according to claim 1, wherein
the processor of the adapter is mounted on a printed circuit board;
the printed circuit board is encapsulated with a polyamide adhesive on the side equipped with the processor, and
the encapsulated printed circuit board forms the housing of the adapter.

6. The valve positioner according to claim 1, wherein the housing of the adapter has a circumferential collar.

7. The valve positioner according to claim 1, wherein the optical signaling device is based on at least one of liquid crystals, electronic paper, and light emitting diodes.

8. The valve positioner according to claim 7, wherein the optical signaling device comprises two light-emitting diodes of different color.

9. The valve positioner according to claim 8, wherein the optical signaling device comprises a red and a green light-emitting diode.

10. The valve positioner according to claim 9, comprising:
a controller configured to display information about the operating status of the valve positioner using the red and green light emitting diodes as specified by the NAMUR codes.

11. The valve positioner according to claim 10, wherein information concerning the operating status of the valve positioner is displayed by means of the red and green light-emitting diodes in the following form:

| status signal | LED |
| --- | --- |
| failure | red |
| function check | flashing red |
| outside of specification | flashing red |
| maintenance required | flashing green |
| correct operation | green. |

* * * * *